(12) United States Patent
Thies, III

(10) Patent No.: US 8,713,883 B2
(45) Date of Patent: May 6, 2014

(54) SHINGLE WITH IMPACT RESISTANT LAYER

(75) Inventor: John A. Thies, III, Eden Prairie, MN (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 13/453,272

(22) Filed: Apr. 23, 2012

(65) Prior Publication Data

US 2012/0266559 A1  Oct. 25, 2012

Related U.S. Application Data

(60) Provisional application No. 61/478,615, filed on Apr. 25, 2011.

(51) Int. Cl.
*E04D 1/00* (2006.01)

(52) U.S. Cl.
USPC .................................. 52/540; 52/518; 52/555

(58) Field of Classification Search
USPC ......... 52/557, DIG. 16, 748.1, 555, 554, 535, 52/528, 518, 540, 98, 556; 156/71; 428/180, 184, 185
See application file for complete search history.

(56) References Cited

U.S. PATENT DOCUMENTS

| | | |
|---|---|---|
| 835,889 A | 11/1906 | Moeller |
| 1,597,135 A | 8/1926 | Wittenberg |
| 1,601,731 A | 10/1926 | Flood |
| 1,665,222 A | 4/1928 | Robinson |
| 1,701,926 A | 2/1929 | Kirschbraun |
| 1,799,500 A | 4/1931 | Brophy |
| 2,161,440 A | 6/1939 | Venrick |
| 2,798,006 A | 7/1957 | Oldfield et al. |
| 2,847,948 A | 8/1958 | Truitt |
| 3,054,222 A | 9/1962 | Buckner |
| 3,082,577 A | 3/1963 | Fasold et al. |
| 3,180,783 A | 4/1965 | Walker et al. |
| 3,236,170 A * | 2/1966 | Meyer et al. .................. 454/365 |
| 3,247,631 A | 4/1966 | Lovness |
| 3,252,257 A | 5/1966 | Price et al. |
| 3,332,830 A | 7/1967 | Tomlinson et al. |
| 3,377,762 A | 4/1968 | Chalmers |
| 3,468,086 A | 9/1969 | Warner |
| 3,468,092 A | 9/1969 | Chalmers |
| 3,624,975 A | 12/1971 | Morgan et al. |
| 3,664,081 A | 5/1972 | Martin et al. |

(Continued)

FOREIGN PATENT DOCUMENTS

| | | |
|---|---|---|
| CA | 1207975 | 7/1986 |
| CN | 2176391 | 9/1994 |

(Continued)

OTHER PUBLICATIONS

International Search Report from PCT/US06/030633 dated Nov. 28, 2006.

(Continued)

*Primary Examiner* — Chi Q Nguyen

(74) *Attorney, Agent, or Firm* — Calfee, Halter & Griswold LLP

(57) ABSTRACT

A roofing shingle includes an underlay sheet, an overlay sheet, and a structural lattice layer bonded between the underlay sheet and the overlay sheet.

9 Claims, 14 Drawing Sheets

(56) References Cited

U.S. PATENT DOCUMENTS

| | | | |
|---|---|---|---|
| 3,848,384 A | 11/1974 | Eaton et al. | |
| 3,949,657 A * | 4/1976 | Sells | 454/365 |
| 4,301,633 A | 11/1981 | Neumann | |
| 4,459,157 A | 7/1984 | Koons | |
| 4,680,909 A | 7/1987 | Stewart | |
| 4,706,435 A | 11/1987 | Stewart | |
| 4,717,614 A | 1/1988 | Bondoc et al. | |
| 4,755,545 A | 7/1988 | Lalwani | |
| 4,803,813 A * | 2/1989 | Fiterman | 52/199 |
| 4,817,358 A | 4/1989 | Lincoln et al. | |
| 4,824,880 A | 4/1989 | Algrim et al. | |
| 4,848,057 A | 7/1989 | MacDonald et al. | |
| 4,952,268 A | 8/1990 | Beck et al. | |
| 5,181,361 A | 1/1993 | Hannah et al. | |
| 5,209,802 A | 5/1993 | Hannah et al. | |
| 5,232,530 A | 8/1993 | Malmquist et al. | |
| 5,239,802 A | 8/1993 | Robinson | |
| 5,251,416 A | 10/1993 | White | |
| 5,305,569 A | 4/1994 | Malmquist et al. | |
| 5,426,902 A | 6/1995 | Stahl et al. | |
| 5,571,596 A | 11/1996 | Johnson | |
| 5,577,361 A | 11/1996 | Grabek, Jr. | |
| 5,611,186 A | 3/1997 | Weaver | |
| 5,660,014 A | 8/1997 | Stahl et al. | |
| 5,706,620 A * | 1/1998 | De Zen | 52/220.2 |
| 5,822,943 A | 10/1998 | Frankoski et al. | |
| 5,860,263 A | 1/1999 | Sieling et al. | |
| 5,901,517 A | 5/1999 | Stahl et al. | |
| 5,916,103 A | 6/1999 | Roberts | |
| 5,950,387 A | 9/1999 | Stahl et al. | |
| 6,010,589 A | 1/2000 | Stahl et al. | |
| 6,021,611 A | 2/2000 | Wells et al. | |
| 6,038,826 A | 3/2000 | Stahl et al. | |
| 6,044,608 A | 4/2000 | Stahl et al. | |
| 6,067,764 A * | 5/2000 | Johansen | 52/302.1 |
| 6,080,495 A * | 6/2000 | Wright | 428/623 |
| 6,083,592 A | 7/2000 | Chich | |
| 6,145,265 A | 11/2000 | Malarkey et al. | |
| 6,148,578 A | 11/2000 | Nowacek et al. | |
| 6,199,338 B1 | 3/2001 | Hudson, Jr. et al. | |
| 6,220,329 B1 | 4/2001 | King et al. | |
| 6,228,785 B1 | 5/2001 | Miller et al. | |
| 6,289,648 B1 | 9/2001 | Freshwater et al. | |
| 6,338,230 B1 * | 1/2002 | Davey | 52/518 |
| 6,343,447 B2 | 2/2002 | Geissels et al. | |
| 6,355,132 B1 | 3/2002 | Becker et al. | |
| 6,397,546 B1 | 6/2002 | Malarkey et al. | |
| 6,397,556 B1 | 6/2002 | Karpinia | |
| 6,471,812 B1 | 10/2002 | Thompson et al. | |
| 6,487,828 B1 | 12/2002 | Phillips | |
| 6,523,316 B2 | 2/2003 | Stahl et al. | |
| 6,530,189 B2 * | 3/2003 | Freshwater et al. | 52/553 |
| 6,591,558 B1 * | 7/2003 | De Zen | 52/91.3 |
| 6,610,147 B2 | 8/2003 | Aschenbeck | |
| 6,652,909 B2 | 11/2003 | Lassiter | |
| 6,679,020 B2 | 1/2004 | Becker et al. | |
| 6,679,308 B2 | 1/2004 | Becker et al. | |
| 6,692,608 B2 | 2/2004 | Phillips | |
| 6,708,456 B2 | 3/2004 | Kiik et al. | |
| 6,709,994 B2 | 3/2004 | Miller et al. | |
| 6,758,019 B2 | 7/2004 | Kalkanoglu et al. | |
| 6,804,919 B2 | 10/2004 | Railkar | |
| 6,823,637 B2 | 11/2004 | Elliott et al. | |
| 6,990,779 B2 | 1/2006 | Kiik et al. | |
| 7,082,724 B2 | 8/2006 | Railkar et al. | |
| 7,118,794 B2 | 10/2006 | Kalkanoglu et al. | |
| 7,127,865 B2 * | 10/2006 | Douglas | 52/745.13 |
| 7,537,820 B2 | 5/2009 | Kalkanoglu et al. | |
| 7,765,763 B2 | 8/2010 | Teng et al. | |
| 7,781,046 B2 | 8/2010 | Kalkanoglu et al. | |
| 7,836,654 B2 | 11/2010 | Belt | |
| 8,156,704 B2 | 4/2012 | Belt | |
| 8,173,243 B2 | 5/2012 | Kalkanoglu et al. | |
| 8,181,413 B2 | 5/2012 | Belt | |
| 8,240,102 B2 | 8/2012 | Belt | |
| 8,371,085 B2 * | 2/2013 | Koch | 52/520 |
| 2001/0049002 A1 | 12/2001 | McCumber et al. | |
| 2003/0040241 A1 | 2/2003 | Kiik et al. | |
| 2003/0093963 A1 | 5/2003 | Stahl et al. | |
| 2004/0055240 A1 | 3/2004 | Kiik et al. | |
| 2004/0083673 A1 | 5/2004 | Kalkanoglu et al. | |
| 2004/0083674 A1 | 5/2004 | Kalkanoglu et al. | |
| 2004/0206035 A1 | 10/2004 | Kandalgaonkar | |
| 2004/0221536 A1 | 11/2004 | Kalkanoglu et al. | |
| 2004/0258883 A1 | 12/2004 | Weaver | |
| 2005/0204675 A1 | 9/2005 | Snyder et al. | |
| 2006/0032174 A1 | 2/2006 | Floyd | |
| 2006/0179767 A1 | 8/2006 | Miller et al. | |
| 2006/0265990 A1 | 11/2006 | Kalkanoglu et al. | |
| 2007/0039274 A1 | 2/2007 | Harrington et al. | |
| 2007/0042158 A1 | 2/2007 | Belt | |
| 2008/0134612 A1 | 6/2008 | Koschitzky | |
| 2008/0229695 A1 | 9/2008 | Kalkanoglu et al. | |
| 2008/0299320 A1 | 12/2008 | Rodrigues et al. | |
| 2009/0193745 A1 | 8/2009 | Kalkanoglu et al. | |
| 2009/0293404 A1 | 12/2009 | Belt | |
| 2010/0077689 A1 | 4/2010 | Kalkanoglu et al. | |
| 2010/0098912 A1 | 4/2010 | Snyder et al. | |
| 2010/0143667 A1 | 6/2010 | Collins et al. | |
| 2010/0310825 A1 | 12/2010 | Kalkanoglu et al. | |
| 2011/0016812 A1 | 1/2011 | Belt | |
| 2011/0072752 A1 | 3/2011 | Aschenbeck et al. | |
| 2011/0139366 A1 | 6/2011 | Belt | |
| 2011/0146185 A1 | 6/2011 | Belt | |
| 2011/0197534 A1 | 8/2011 | Belt | |
| 2011/0232220 A1 | 9/2011 | Belt | |
| 2011/0283646 A1 | 11/2011 | Vermilion | |
| 2012/0047838 A1 | 3/2012 | Kalkanoglu et al. | |
| 2012/0210666 A1 | 8/2012 | Kalkanoglu et al. | |
| 2013/0180196 A1 | 7/2013 | Kalkanoglu et al. | |

FOREIGN PATENT DOCUMENTS

| | | |
|---|---|---|
| JP | 50-002937 | 1/1975 |
| WO | 2007/019399 | 2/2007 |
| WO | 2007/108846 | 9/2007 |
| WO | 2008/052029 | 5/2008 |

OTHER PUBLICATIONS

International Search Report from PCT/US07/007827 dated Aug. 29, 2007.
Office action from U.S. Appl. No. 11/198,522 dated Apr. 17, 2007.
Interview Summary from U.S. Appl. No. 11/396,498 dated Jul. 25, 2007.
Office action from U.S. Appl. No. 11/198,522 dated Oct. 31, 2007.
Office action from U.S. Appl. No. 11/198,522 dated Feb. 20, 2008.
Interview Summary from U.S. Appl. No. 11/198,522 dated Aug. 11, 2008.
Office action from U.S. Appl. No. 11/198,522 dated Sep. 30, 2008.
Office action from U.S. Appl. No. 11/198,522 dated Aug. 4, 2009.
Office action from U.S. Appl. No. 11/198,522 dated Mar. 4, 2010.
Notice of Allowance from U.S. Appl. No. 11/198,522 dated Oct. 5, 2010.
Office action from U.S. Appl. No. 11/396,498 dated Aug. 21, 2009.
Office action from U.S. Appl. No. 11/396,498 dated Mar. 18, 2010.
Office action from U.S. Appl. No. 11/396,498 dated Jul. 8, 2010.
Advisory action from U.S. Appl. No. 11/396,498 dated Sep. 30, 2010.
Interview Summary from U.S. Appl. No. 11/396,498 dated Oct. 20, 2010.
Office action from U.S. Appl. No. 11/396,498 dated Aug. 23, 2011.
Office action from U.S. Appl. No. 11/396,498 dated Dec. 21, 2011.
Notice of Allowance from U.S. Appl. No. 11/396,498 dated Feb. 12, 2013.
Notice of Allowance from U.S. Appl. No. 11/396,498 dated May 23, 2013.
Office action from U.S. Appl. No. 11/997,657 dated Nov. 5, 2008.
Office action from U.S. Appl. No. 11/997,657 dated Mar. 2, 2011.
Office action from U.S. Appl. No. 11/997,657 dated Aug. 12, 2011.
Interview Summary from U.S. Appl. No. 11/997,657 dated Oct. 14, 2011.

(56) References Cited

OTHER PUBLICATIONS

Office action from U.S. Appl. No. 11/997,657 dated Nov. 9, 2011.
Interview Summary from U.S. Appl. No. 11/997,657 dated Jan. 11, 2012.
Interview Summary from U.S. Appl. No. 11/997,657 dated Jan. 30, 2012.
Interview Summary from U.S. Appl. No. 11/997,657 dated Mar. 5, 2012.
Office action from U.S. Appl. No. 11/997,657 dated Apr. 11, 2012.
Notice of Allowance from U.S. Appl. No. 11/997,657 dated May 9, 2012.
Office action from U.S. Appl. No. 12/895,195 dated Dec. 22, 2010.
Office action from U.S. Appl. No. 12/895,195 dated May 11, 2011.
Notice of Allowance from U.S. Appl. No. 12/895,195 dated Feb. 28, 2011.
Office action from U.S. Appl. No. 12/895,195 dated Oct. 13, 2011.
Notice of Allowance from U.S. Appl. No. 12/895,195 dated Feb. 29, 2012.
Office action from U.S. Appl. No. 13/036,200 dated Aug. 3, 2011.
Interview Summary from U.S. Appl. No. 13/036,200 dated Sep. 29, 2011.
Interview Summary from U.S. Appl. No. 13/036,200 dated Dec. 30, 2011.
Office action from U.S. Appl. No. 13/036,200 dated Jan. 25, 2012.
Office action from U.S. Appl. No. 13/036,200 dated May 15, 2012.
Interview Summary from U.S. Appl. No. 13/036,200 dated Jun. 27, 2012.
Notice of Allowance from U.S. Appl. No. 13/036,200 dated Jul. 17, 2012.
Notice of Allowance from U.S. Appl. No. 13/097,810 dated Aug. 20, 2013.
Notice of Allowance from U.S. Appl. No. 13/036,200 dated Feb. 5, 2013.
Notice of Allowance from U.S. Appl. No. 13/036,200 dated May 23, 2013.
Office action from U.S. Appl. No. 13/036,356 dated May 11, 2011.
Office action from U.S. Appl. No. 13/036,356 dated Oct. 4, 2011.
Interview Summary from U.S. Appl. No. 13/036,356 dated Dec. 29, 2011.
Notice of Allowance from U.S. Appl. No. 13/036,356 dated Jan. 23, 2012.
Office action from U.S. Appl. No. 13/097,810 dated Aug. 29, 2012.
Notice of Allowance from U.S. Appl. No. 13/097,810 dated Feb. 25, 2013.
Notice of Allowance from U.S. Appl. No. 13/097,810 dated Apr. 10, 2013.
Office action from U.S. Appl. No. 13/155,600 dated Sep. 15, 2011.
Notice of Abandonment from U.S. Appl. No. 13/155,600 dated Mar. 22, 2012.
Office action from U.S. Appl. No. 13/193,900 dated May 14, 2013.
Office action from Chinese Application No. 200680028893.4 dated Apr. 24, 2009 or Mar. 27, 2009.
Office action from Japanese Application No. 2008-525265 dated Dec. 12, 2011.
Office action from Japanese Application No. 2008-525265 dated Nov. 5, 2012.
Office action from U.S. Appl. No. 12/193,900 dated Jan. 10, 2014.
Notice of Allowance from U.S. Appl. No. 14/105,913 dated Feb. 7, 2014.
Office action from U.S. Appl. No. 13/193,900 dated Jan. 10, 2014.

* cited by examiner

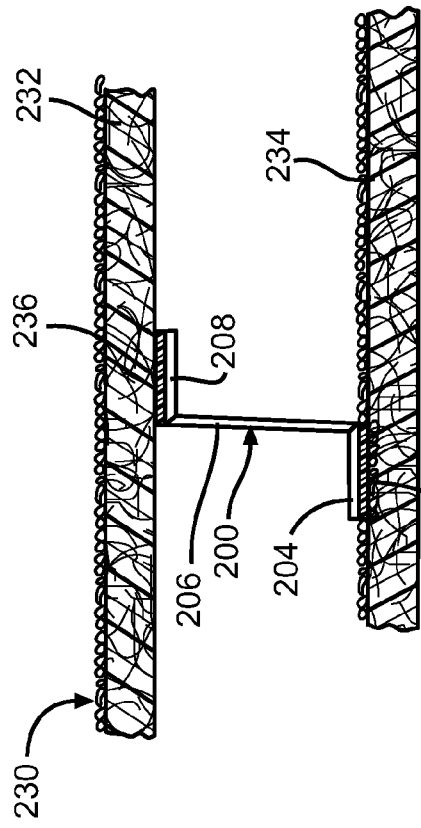
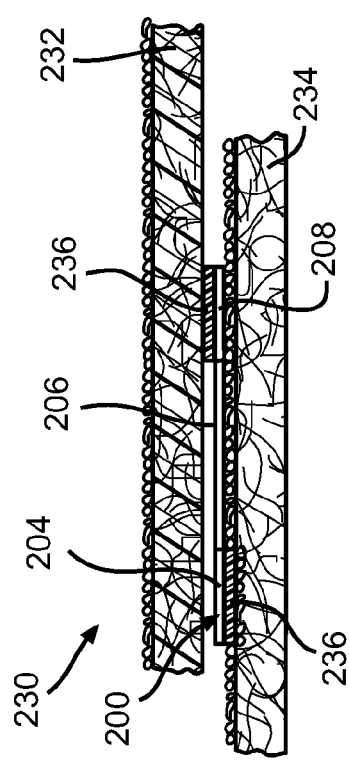
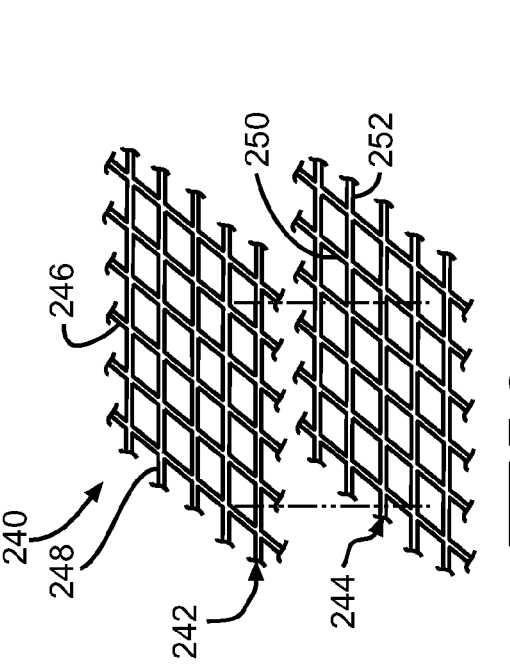
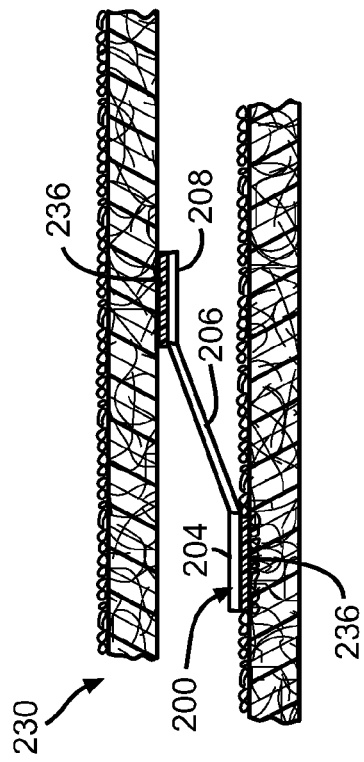
FIG. 25A
FIG. 25B
FIG. 25C
FIG. 26

SHINGLE WITH IMPACT RESISTANT LAYER

CROSS REFERENCE TO RELATED APPLICATIONS

This application claims the benefit of U.S. Provisional Application No. 61/478,615 filed Apr. 25, 2011.
Inventor: John A. Thies, III.

BACKGROUND

This invention relates to roofing material. More particularly, this invention relates to roofing material with improved impact resistance.

Asphalt-based roofing materials, such as roofing shingles, roll roofing and commercial roofing, are installed on the roofs of buildings to provide protection from the elements and to give the roof an aesthetically pleasing look. Typically, the roofing material is constructed of a substrate such as a glass fiber mat or an organic felt, an asphalt coating on the substrate, and a protective and/or decorative surface layer of granules of stone, mineral, sand or other particulate material is embedded in the tacky asphalt coating.

It is well known in the roofing industry that irregularity or variation in shingle design provides a roof that is aesthetically pleasing and in popular demand. Mass produced asphalt roofing shingles of the ordinary three-tab variety, when placed on the roof, result in a roof that sometimes appears flat, dimensionless, and uninteresting. Shingle manufacturers have attempted to provide a better appearance to such roofs by using variations in the thickness and in the tab cutout design of shingles. The goal is to produce a random looking sequence or pattern of shingles on the roof, similar to the appearance of a roof shingled with wood shingles having varying widths, lengths, and thicknesses.

Thus, it would be desirable to provide an improved roofing shingle that addresses the issues discussed above.

SUMMARY OF THE INVENTION

The present application describes various embodiments of a roofing shingle that provides improved impact resistance. One embodiment of the roofing shingle includes an underlay sheet, an overlay sheet, and a structural lattice layer bonded between the underlay sheet and the overlay sheet.

In another embodiment, a method of making a laminated shingle includes laminating a continuous sheet of structural lattice material between a continuous overlay sheet and a continuous underlay sheet to define a laminated sheet, and cutting the laminated sheet into a plurality of laminated shingles.

In an additional embodiment, a method of making a laminated shingle includes bonding a sheet of structural lattice material to one of a continuous overlay sheet portion and a continuous underlay sheet portion of a continuous granule-coated sheet. The continuous overlay sheet is then longitudinally separated from the continuous underlay sheet. The sheet of structural lattice material is laminated between the continuous overlay sheet and the continuous underlay sheet, thereby defining a laminated sheet, and the laminated sheet is cut into a plurality of laminated shingles.

In another embodiment, a roofing shingle includes a substrate and a structural lattice layer bonded to an underside of the substrate.

In a further embodiment, a method of installing a roof covering on a roof deck includes disposing structural lattice material on a roof deck, and securing a plurality of roofing shingles to the roof deck through the structural lattice material.

Other advantages of the roofing shingle will become apparent to those skilled in the art from the following detailed description, when read in light of the accompanying drawings.

BRIEF DESCRIPTION OF THE DRAWINGS

FIG. 25A is a schematic elevational view in cross-section of a laminated shingle having the structural lattice layer illustrated in FIGS. 22 and 24 and showing the structural lattice layer in a substantially flat position.

FIG. 25B is a schematic elevational view in cross-section of the laminated shingle illustrated in FIG. 25A showing the structural lattice layer in an intermediate position.

FIG. 25C is a schematic elevational view in cross-section of the laminated shingle illustrated in FIGS. 25A and 25B showing the structural lattice layer in a fully open or spaced position.

FIG. 26 is an exploded perspective view of a fifth embodiment of a structural lattice layer according to the invention.

DETAILED DESCRIPTION

Figure 1:
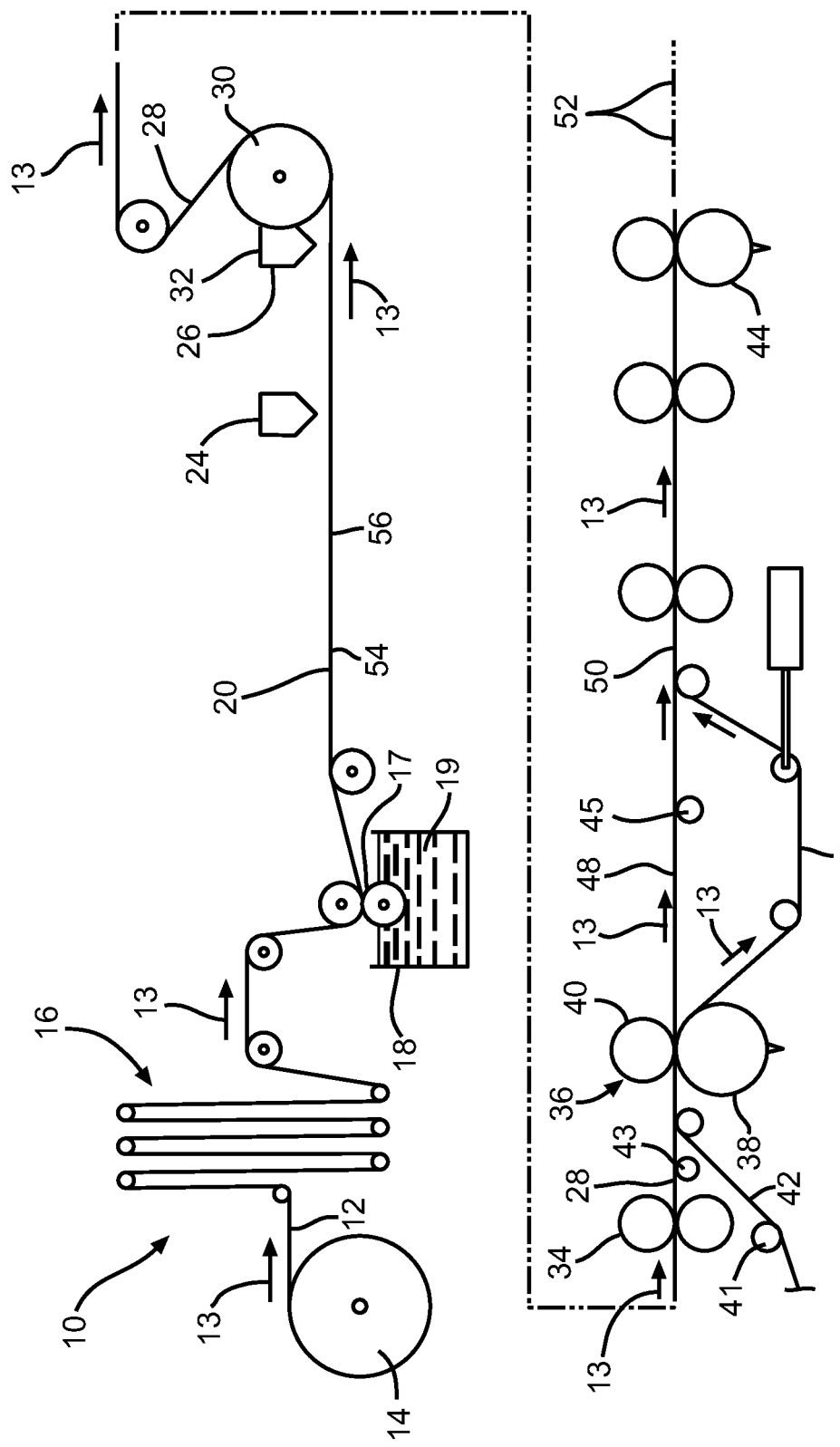
FIG. 1 is a schematic view in elevation of an apparatus for manufacturing an asphalt-based roofing material according to the invention.

The present invention will now be described with occasional reference to the illustrated embodiments of the invention. This invention may, however, be embodied in different forms and should not be construed as limited to the embodiments set forth herein, nor in any order of preference. Rather, these embodiments are provided so that this disclosure will be more thorough, and will convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

As used in the description and the appended claims, the phrase "asphalt coating" is defined as any type of bituminous material suitable for use on a roofing material, such as asphalts, tars, pitches, or mixtures thereof. The asphalt may be either manufactured asphalt produced by refining petroleum or naturally occurring asphalt. The asphalt coating may include various additives and/or modifiers, such as inorganic fillers or mineral stabilizers, organic materials such as polymers, recycled streams, or ground tire rubber. Preferably, the asphalt coating contains asphalt and an inorganic filler or mineral stabilizer.

As used in the description of the invention and the appended claims, the term "longitudinal" or "longitudinally" is defined as substantially parallel with the machine direction.

As used in the description of the invention and the appended claims, the term "living hinge" is defined as a portion, such as a thinned section that joins two rigid plastic parts together, allowing the two parts to bend along the line of the hinge.

Laminated composite shingles, such as asphalt shingles, are a commonly used roofing product. Asphalt shingle production generally includes feeding a base material from an upstream roll and coating it first with a roofing asphalt material, then a layer of granules. The base material is typically made from a fiberglass mat provided in a continuous shingle membrane or sheet. It should be understood that the base material can be any suitable support material.

Referring now to the drawings, there is shown in FIG. 1 an apparatus 10 for manufacturing an asphalt-based roofing material, and more particularly for applying granules onto an asphalt-coated sheet. The illustrated manufacturing process involves passing a continuous sheet of substrate or shingle mat 12 in a machine direction 13 through a series of manufacturing operations. The sheet usually moves at a speed of at least about 200 feet/minute (61 meters/minute), and typically at a speed within the range of between about 450 feet/minute (137 meters/minute) and about 620 feet/minute (244 meters/minute). However, other speeds may be used.

In a first step of the manufacturing process, the continuous sheet of shingle mat 12 is payed out from a roll 14. The shingle mat 12 may be any type known for use in reinforcing asphalt-based roofing materials, such as a nonwoven web of glass fibers. Alternatively, the substrate may be a scrim or felt of fibrous materials such as mineral fibers, cellulose fibers, rag fibers, mixtures of mineral and synthetic fibers, or the like.

The sheet of shingle mat 12 is passed from the roll 14 through an accumulator 16. The accumulator 16 allows time for splicing one roll 14 of substrate to another, during which time the shingle mat 12 within the accumulator 16 is fed to the manufacturing process so that the splicing does not interrupt manufacturing.

Next, the shingle mat 12 is passed through a coater 18 where a coating of hot, melted filled-asphalt 19 is applied to the shingle mat 12 to form an asphalt-coated sheet 20. The asphalt coating 19 may be applied in any suitable manner, such as by applying asphalt on top of the shingle mat 12 immediately prior to the rollers 17. In the illustrated embodiment, the shingle mat 12 moves between the nip point of the two roller configuration 17. The rollers 17 completely cover the top of the shingle mat 12 with a tacky coating of asphalt 19. However, in other embodiments, the asphalt coating 19 could be sprayed on, rolled on, or applied to the shingle mat 12 by other means. Typically, the asphalt coating is highly filled with a ground mineral filler material, amounting to at least about 60 percent by weight of the asphalt/filler combination. In one embodiment, the asphalt coating 19 is in a range from about 350 degrees F. to about 400 degrees F. In another embodiment, the asphalt coating 19 may be more than 400 degrees F. or less than 350 degrees F. The shingle mat 12 exits the coater 18 as an asphalt-coated sheet 20. The asphalt coating 19 on the asphalt-coated sheet 20 remains hot.

Figure 2:
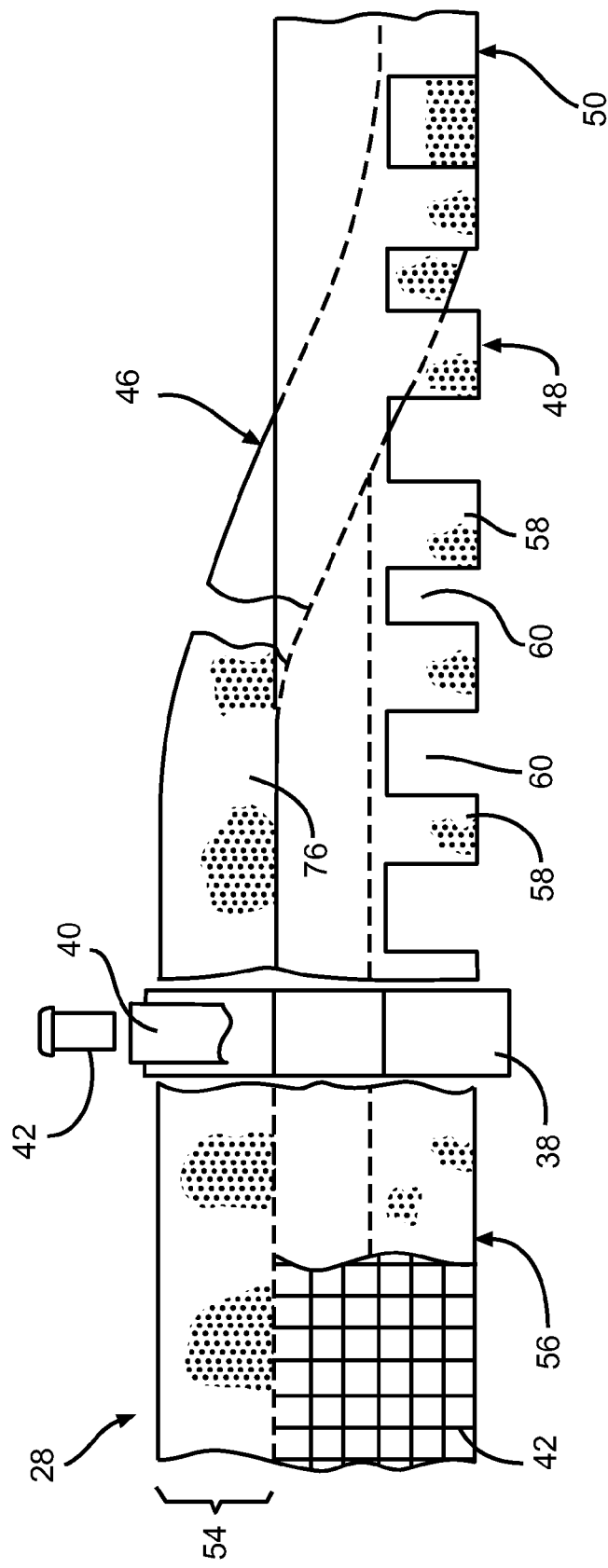
FIG. 2 is a plan view of a portion of the apparatus illustrated in FIG. 1, showing the laminating of the structural lattice material between the continuous overlay sheet and the continuous underlay sheet.

The asphalt-coated sheet 20 is passed beneath a granule applicator, shown schematically at 24, where granules are applied to the continuous underlay sheet portion 54 of the asphalt-coated sheet 20. In the illustrated embodiment, the granule applicator is a blend drop applicator. The blend drop applicator 24 applies blend drop granules to the continuous overlay sheet portion 56 of the asphalt-coated sheet 20 to define blend drops. Although only one blend drop applicator 24 is shown, it will be understood that several blend drop applicators 24 may be used. Alternatively, the blend drop applicator 24 may be adapted to supply several streams of blend drops, or blend drops of different colors, shading, or size to the continuous overlay sheet portion 56, as best shown in FIG. 2. The blend drop applicator 24 may also apply blend drop granules to a prime region of the continuous underlay sheet portion 54 of the asphalt-coated sheet 20.

The asphalt-coated sheet 20 is then passed beneath a third granule applicator. In the illustrated embodiment, the third granule applicator is a backfall granule applicator 26, for applying additional granules, such as background granules and headlap granules, onto the asphalt-coated sheet 20. The backfall granule applicator 26 includes a spill hopper 32.

The background granules are applied to the extent that the top side of the asphalt-coated sheet 20 becomes completely covered with granules, thereby defining a continuous granule-coated sheet 28. The granule-coated sheet 28 includes a continuous underlay sheet portion 54 and a continuous overlay sheet portion 56, as best shown in FIG. 2 and described in detail below. The granule-coated sheet 28 is then turned around a slate drum 30 to press the granules into the asphalt coating and to temporarily invert the sheet 28. Such inverting of the granule-coated sheet 28 causes any excess granules to drop off the granule-coated sheet 28 on the backside of the slate drum 30. The excess granules are collected by the spill hopper 32 of the backfall granule applicator 26 and may be reused. As described below, the spill hopper 32 is positioned on the backside of the slate drum 30. After the granule-coated sheet 28 is turned around the slate drum 30, a backing agent, such as sand is applied to the underside of the granule-coated sheet 28 to the extent that the underside becomes entirely encapsulated. Release film may be applied to the underside of the granule-coated sheet 28 while the granule-coated sheet 28 wraps around the slate drum 30 and prior to the application of the backing agent.

The continuous granule-coated sheet 28 is fed through pull rolls 34 that regulate the speed of the sheet 28 as it moves downstream. In one embodiment, at least one of the pull rolls 34 is driven by a motor (not shown).

A set of rolls 41 feeds a continuous sheet of structural lattice material 42 beneath the continuous overlay sheet portion 56. The structural lattice material 42 is bonded to the continuous overlay sheet portion 56 as described below. If desired, adhesive, such as modified asphalt adhesive, may be applied to either the structural lattice material 42 or the underside of the continuous overlay sheet portion 56 by an adhesive applicator, schematically shown at 43.

The granule-coated sheet 28 is subsequently fed through a rotary pattern cutter 36 which includes a bladed cutting cylinder 38 and an anvil roll 40. The pattern cutter 36 cuts a repeated pattern of tabs 58 and cutouts 60, as shown in FIG. 2. The pattern cutter 36 also longitudinally cuts the granule-coated sheet 28 into the continuous underlay sheet 46 and the continuous overlay sheet 48.

As shown in FIG. 2, the continuous underlay sheet 46 is directed to be aligned beneath the continuous overlay sheet 48, and the structural lattice material 42 is laminated between the two sheets 46, 48 to form a continuous laminated sheet 50. As shown in FIG. 1, the continuous underlay sheet 46 is routed on a longer path than the path of the continuous overlay sheet 48. Alternatively, the continuous overlay sheet 48 may be routed on a longer path than the path of the continuous underlay sheet 46.

Further downstream, the continuous laminated sheet 50 is passed into contact with a rotary length cutter 44 that cuts the laminated sheet 50 into individual thickened laminated shingles 52. The thickened laminated shingles 52 include an underlay sheet 62, an overlay sheet 64, and a structural lattice layer 66, best shown in FIG. 7. The thickened laminated shingles 52 may be delivered, one at a time, at a rapid rate, to a shingle catcher (not shown). The shingle catcher typically includes a stop member or wall into which the rapidly moving shingles 52 collide, thus stopping the shingle 52. The stopped shingles 52 may be moved to a shingle stacking assembly where the shingles 52 are stacked and packaged.

Figure 3:
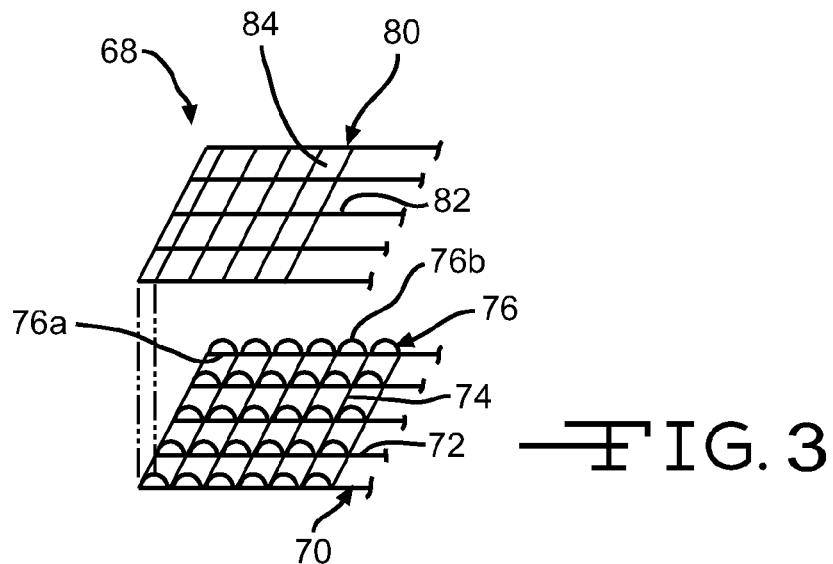
FIG. 3 is an exploded schematic perspective view of a first embodiment of the structural lattice layer according to the invention.

Referring now to FIG. 3, a first embodiment of the structural lattice layer is schematically illustrated at 68. The illustrated structural lattice layer 68 is formed from plastic. Alternatively, the structural lattice layer 68 may be formed from any material that has UV resistance, resilience to withstand impact, and structural loading capacity consistent with the capacity to which shingle products may be exposed.

The structural lattice layer 68 includes a base 70 having longitudinal members 72 and transverse members 74 arranged in a grid pattern and defining a mesh. A plurality of support members 76 are integrally formed with the base 70. The support members 76 extend outward of the longitudinal members 72 substantially perpendicularly to the base 70 and define longitudinal rows of arches 76.

Figure 4:
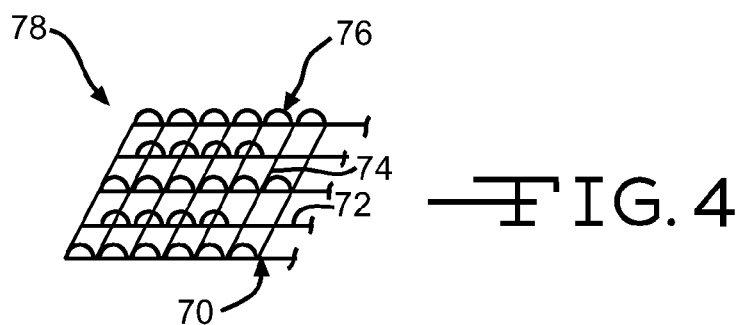
FIG. 4 is a schematic perspective view of a second embodiment of the structural lattice layer according to the invention.
Figure 5A:
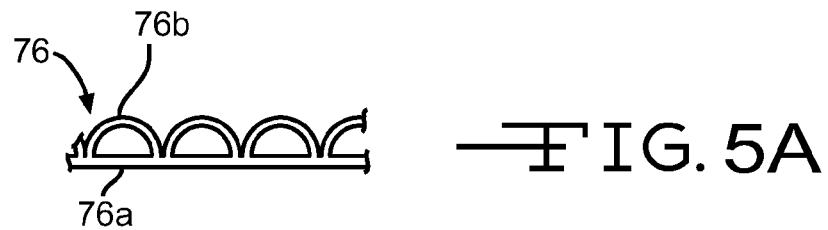
FIG. 5A is an enlarged elevational view of a first embodiment of the support members illustrated in FIGS. 3 and 4.
Figure 5B:
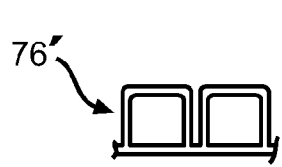
FIG. 5B is an enlarged elevational view of a second embodiment the support members illustrated in FIGS. 3 and 4.
Figure 5C:
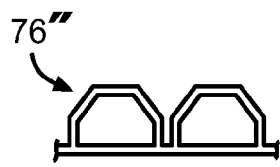
FIG. 5C is an enlarged elevational view of a third embodiment the support members illustrated in FIGS. 3 and 4.

In the embodiments illustrated in FIGS. 3 and 4, and as best shown in FIG. 5A, the support members 76 are formed as arches and are arranged in longitudinal rows on the longitudinal members 72 and further are substantially aligned in parallel rows in the transverse direction. Each arch 76 has a first end or base 76a and a second end defined by the apex 76b. Alternatively, the support members 76 may have any other desired shape, such as the substantially square shape as shown at 76' in FIG. 5B, and the six-sided or half-octagon shape shown at 76" in FIG. 5C. Advantageously, and as will be described in detail below, the structural lattice layer 68 defines a tension/compression member of a laminated shingle and provides the laminated shingle with improved impact resistance.

Referring now to FIG. 4, a second embodiment of the structural lattice layer is schematically illustrated at 78. The structural lattice layer 78 is substantially similar to the structural lattice layer 68, and includes the base 70 having longitudinal members 72 and transverse members 74. A plurality of support members or arches 76 are integrally formed with and extend outward of, the base 70. The arches 76 are arranged in longitudinal rows on the longitudinal members 72.

In the embodiment of the structural lattice layer 78, the arches 76 are arranged on the base 70 such that the arches 76 in one longitudinal row of arches is longitudinally offset from the arches 76 in an adjacent longitudinal row of arches. It will be understood that the specific location, size, and configuration of the arches 76 may be provided in various other configurations to improve and/or optimize the performance characteristics of the various embodiments of the shingles disclosed herein.

If desired, the structural lattice layer 68, illustrated in FIGS. 3A and 3B, and the structural lattice layer 78, illustrated in FIG. 4, may include a footing or mesh top layer 80 similar to the base 70 shown in FIG. 3. The illustrated top layer 80 includes longitudinal members 82 and transverse members 84 connecting the apexes 76b of the arches 76. It will be understood that the structural lattice layer 68 is shown in an exploded view for clarity.

It will also be understood that either the top layer 80 and/or the apexes 76b of the arches 76 may be bonded to the underside of the continuous overlay sheet portion 56 with any desired adhesive, such as modified asphalt adhesive, as shown at 43 in FIG. 1. Additionally, the base 70 may be bonded to an upper surface of the underlay sheet 46 with the asphalt of the underlay sheet or with any desired adhesive, such as modified asphalt adhesive when the structural lattice material 42 is laminated between the two sheets 46, 48 to form the continuous laminated sheet 50, as shown in FIG. 2. Alternatively, adhesive, such as modified asphalt adhesive, may be applied to the base 70 with an adhesive applicator, schematically shown at 45.

Figure 22:
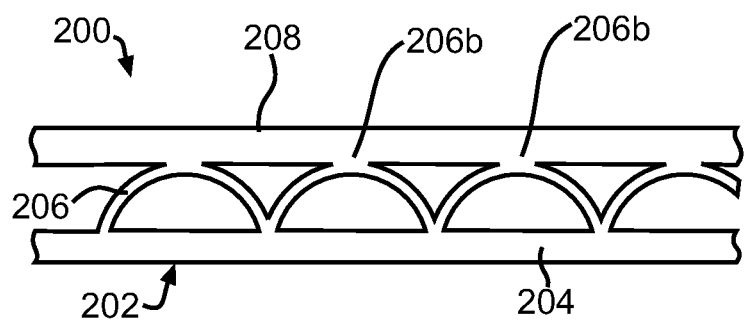
FIG. 22 is an enlarged elevational view of a third embodiment of a structural lattice layer according to the invention.
Figure 24A:
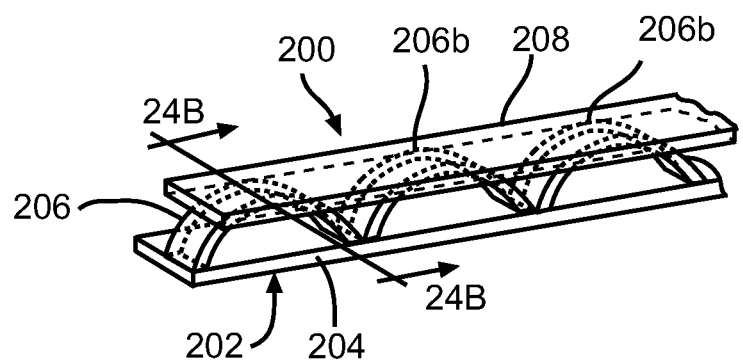
FIG. 24A is an enlarged perspective view of a portion of the structural lattice layer illustrated in FIG. 22.
Figure 24B:
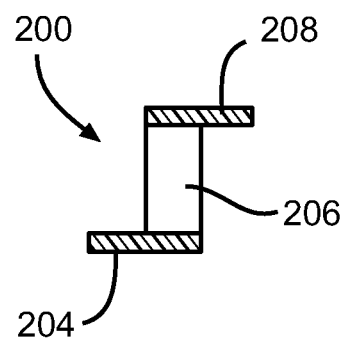
FIG. 24B is an enlarged side elevational view in cross-section of the structural lattice layer illustrated in FIG. 24A.

Referring now to FIGS. 22 and 24, a portion of a third embodiment of the structural lattice layer is schematically illustrated at 200. The structural lattice layer 200 is similar to the structural lattice layer 68 and includes a base 202 having longitudinal members or base footings 204. If desired, the base 202 may include transverse members (not shown) arranged in a grid pattern to define a mesh. A plurality of support members 206 are integrally formed with the base 202. The support members 206 extend outward of the base footings 204 substantially perpendicularly to the base 202 and define longitudinal rows of arches 206.

The illustrated structural lattice layer 200 includes an apex footing 208. The illustrated apex footing 208 extends longitudinally and connects the apexes 206b of the arches 206. If desired, the structural lattice layer 200 may include transverse members (not shown) attached to the apex footings 208 and arranged in a grid pattern to define a mesh.

In the illustrated embodiment, the base footing 204 and the apex footing 208 define substantially flat flanges that extend substantially perpendicularly to the arches 206 and substantially parallel with each other.

FIGS. 25A, 25B, and 25C illustrate the structural lattice layer 200 installed in a laminated shingle 230. The laminated shingle 230 includes an overlay sheet 232 and an underlay sheet 234. The base footing 204 and the apex footing 208 are bonded to the underlay sheet 234 and the overlay sheet 232, respectively, with adhesive 236. The adhesive 236 may be any desired adhesive, such as modified asphalt adhesive.

Figure 23:
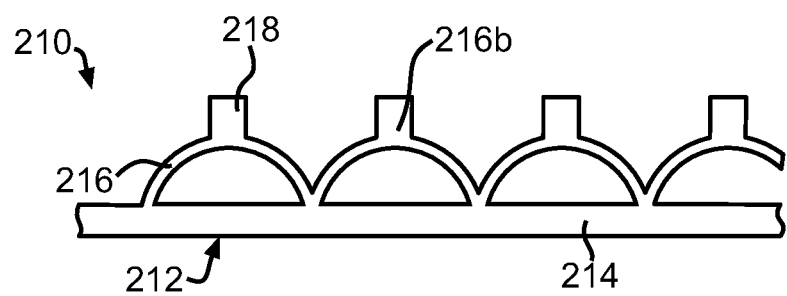
FIG. 23 is an enlarged elevational view of a fourth embodiment of a structural lattice layer according to the invention.

Referring now to FIG. 23, a portion of a fourth embodiment of the structural lattice layer is schematically illustrated at 210. The structural lattice layer 210 includes a base 212 having base footings 214. If desired, the base 222 may include transverse members (not shown) arranged in a grid pattern to define a mesh. A plurality of support members 216 are integrally formed with the base 212. The support members 216 extend outward of the longitudinal members 214 substantially perpendicularly to the base 212 and define longitudinal rows of arches 216.

Each arch 216 in the illustrated structural lattice layer 210 includes an apex footing boss 218. The illustrated apex footing bosses 218 extend outwardly from the apexes 216b of the arches 216. It will be understood that the laminated shingle 230 may also be formed with the structural lattice layer 210. Like the apex footing 208 illustrated in FIGS. 25A, 25B, and 25C, the bosses 218 may be bonded to the underside of the overlay sheet 232, such as with the adhesive 236. The adhesive 236 may be any desired adhesive, such as modified asphalt adhesive.

As best shown in FIGS. 25A through 25C, the structural lattice layer 200 defines a folding member that may be folded or moved from a substantially flat position as shown in FIG. 25A, through an intermediate position as shown in FIG. 25B, to a fully open or spaced position as shown in FIG. 25C.

Referring now to FIG. 26, a portion of a fifth embodiment of the structural lattice layer is schematically illustrated at 240. The structural lattice layer 240 includes a first base member 242 connected to a second base member, illustrated by the phantom line 244. The first base member 242 includes longitudinal members 246 and transverse members 248 arranged in a grid pattern and defining a mesh. The second base member 244 includes longitudinal members 250 and transverse members 252 arranged in a grid pattern and defining a mesh. The first and second base members 242 and 244 are aligned such that the longitudinal members 250 and transverse members 252 of the second base member 244 are centered between adjacent longitudinal members 246 and transverse members 248, respectively, of the first base member 242. It will be understood that in addition to being bonded between the underlay sheet and the overlay sheet of a laminated shingle, the structural lattice layer 240 may be bonded to the underside of a single-layer shingle, such as a three-tab shingle. Additionally, if desired, any of the embodiments of the structural lattice layer illustrated and described herein may be bonded to the underside of a single-layer shingle, such as a three-tab shingle.

Figure 27:
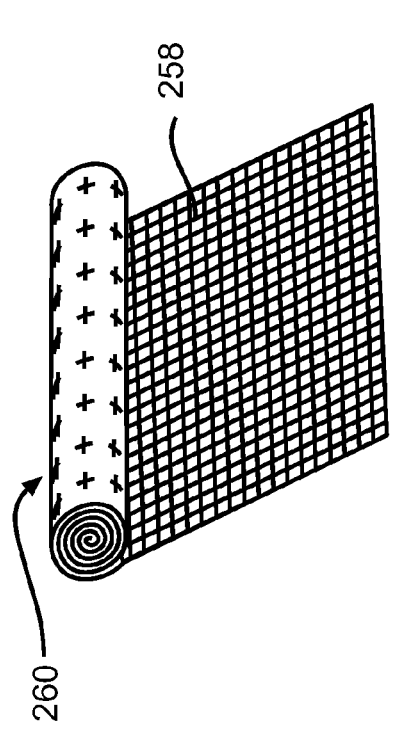
FIG. 27 is a schematic perspective view of a roll of the structural lattice material illustrated in FIG. 26.
Figure 28:
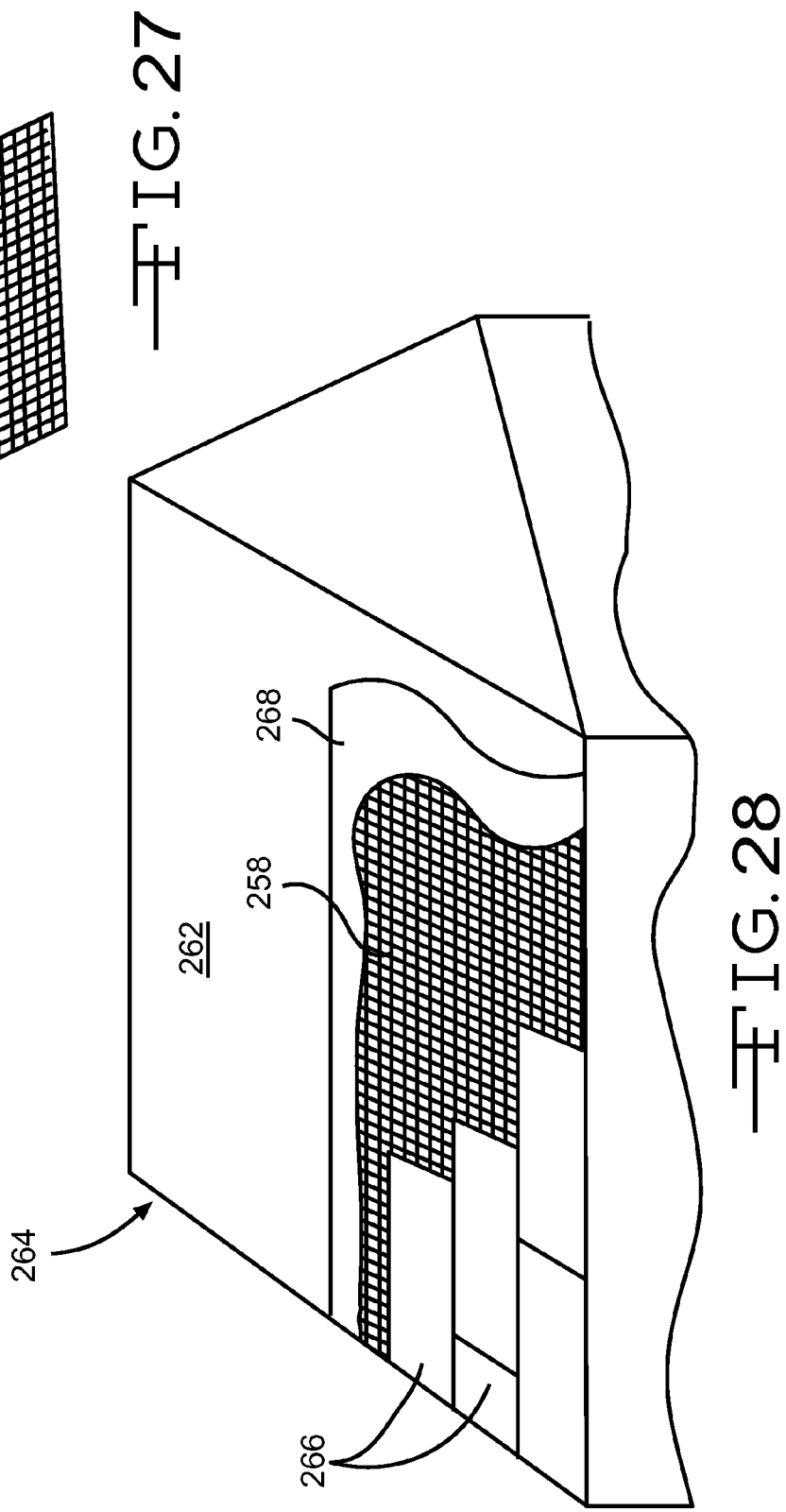
FIG. 28 is a schematic perspective view of a building structure showing the rolled structural lattice material illustrated in FIG. 27 installed on a roof deck.

As shown in FIGS. 27 and 28, the structural lattice material schematically illustrated at 258 may also be formed in a roll 260 for installation directly on a roof deck 262 of a building structure 264. The structural lattice material 258 may be any of the embodiments of the structural lattice material described above, such as the material that forms the structural lattice layer 240 illustrated in FIG. 26. For example, when formed in a roll 260, the structural lattice material 258 may be unrolled and disposed on the roof deck 262. If desired, the roll 260 of the structural lattice material 258 may be attached to the roof deck 262 with adhesive or mechanical fasteners. After the structural lattice material 258 is disposed on the roof deck 262, shingles 266 may be attached to the roof deck 262 over the structural lattice material 258 by any means, such as with mechanical fasteners (not shown). It will be understood that the shingles 266 attached to the roof deck 262 over the structural lattice material 258 may be any type of shingle, including multi-layered laminated shingles and single-layer shingles, such as a three-tab shingles. It will be further understood that the roll 260 of the structural lattice material 258 may be disposed on the roof deck 262 without adhesive or mechanical fasteners, such that the mechanical fasteners used to attach the shingles 266 to the roof deck 262 extend through the structural lattice material 258 and into the roof deck 262. If desired, an underlayment layer 268 may be disposed between the roof deck 262 and the structural lattice material 258.

Figure 14:
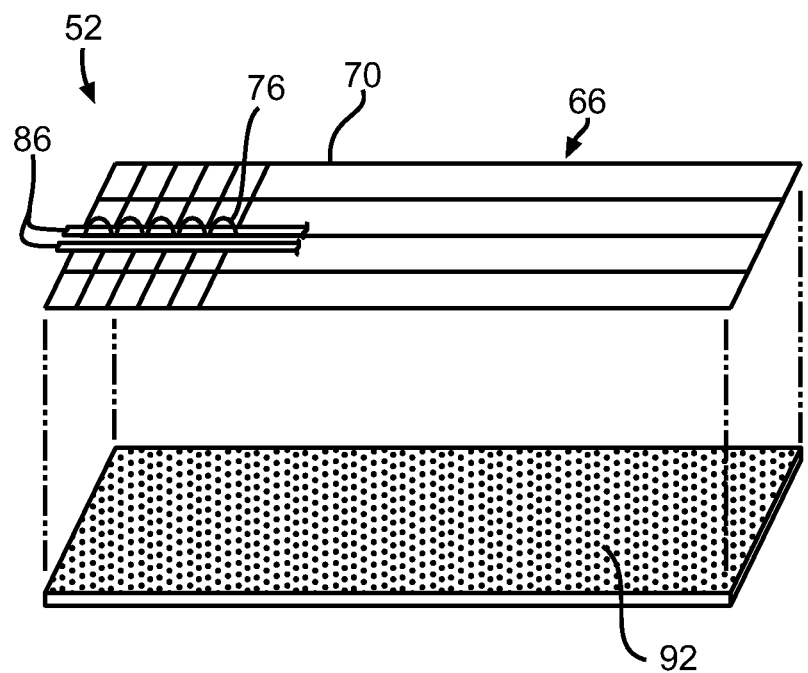
FIG. 14 is an exploded schematic perspective view of a portion of the laminated shingle illustrated in FIG. 6, showing strips of release tape on the upper surface of the base of the lattice layer.
Figure 15:
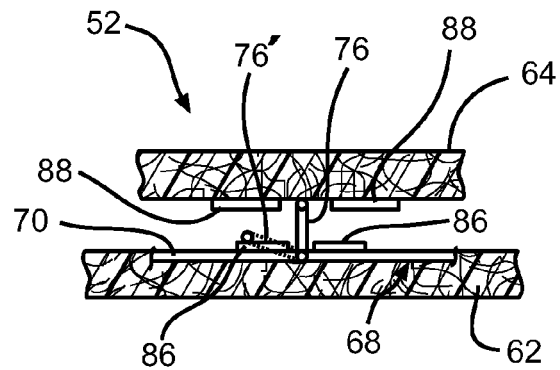
FIG. 15 is a schematic side elevational view in cross-section of the embodiment of the laminated shingle illustrated in FIG. 14.

If desired, strips of release tape 86 may extend longitudinally and may be adhered to the upper surface of the base 70 of the structural lattice layer 66 adjacent and parallel to the arches 76, as shown in FIGS. 14 and 15 (in FIG. 15, the phantom line 76' illustrated the arch in a flat position). The tape 86 may be applied on top of the continuous underlay sheet portion 54 of the asphalt-coated sheet 20 between the coater 18 and the blend drop applicator 24. The structural lattice layer 66 is then positioned between the release tapes 86. This configuration is advantageous in the headlap area or in the exposed portion of the laminated shingle 52 when there are no cutouts 60. An example of a suitable tape is MYLAR® tape. Alternatively, other tapes such as polyester, single sided silicone impregnated webbing, or waxed paper may be used.

Similarly, strips of release tape 88 may extend longitudinally and may be adhered to the underside of the overlay sheet 64. As shown in FIG. 15, the release tape 88 is slightly off-set from the release tape 86 of the underlay sheet 62. The purpose of the release tape will be explained below.

Figure 6:
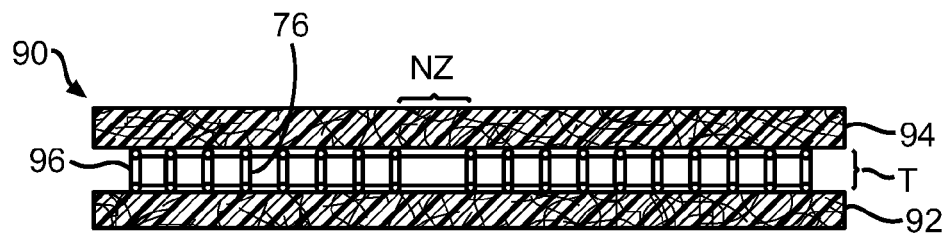
FIG. 6 is a schematic elevational view in cross-section of a first embodiment of a laminated shingle according to the invention.

Referring now to FIG. 6, a cross-sectional elevational view of a first embodiment of a laminated shingle having a structural lattice layer 96 is shown at 90. The laminated shingle 90 includes an underlay sheet 92, an overlay sheet 94, and a lattice layer 96 of substantially equal width. It will be understood that the structural lattice layer 96 may have any desired height or thickness T. A nail zone is defined at NZ. The tension/compression member or structural lattice layer 96 of the laminated shingle 90 provides the laminated shingle 90 with improved impact resistance.

Figure 7:
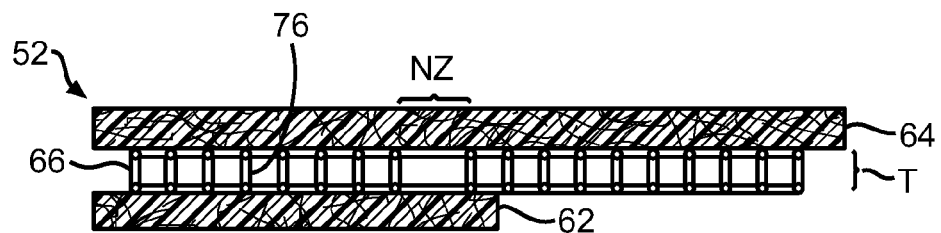
FIG. 7 is a schematic elevational view in cross-section of a second embodiment of a laminated shingle according to the invention.

Referring now to FIG. 7, a cross-sectional elevational view of a second embodiment of a laminated shingle having a structural lattice layer is shown at 52. The laminated shingle 52 includes an underlay sheet 62, an overlay sheet 64, and a structural lattice layer 66. In the embodiment illustrated in FIG. 7, the overlay sheet 64 and the lattice layer 66 are of substantially equal width. It will be understood that the structural lattice layer 66 may have any desired height or thickness T. The underlay sheet 62 has a width smaller than the widths of the overlay sheet 64 and the lattice layer 66. A nail zone is defined at NZ and is configured such that a nail will extend through the overlay sheet 64, the lattice layer 66, and the underlay sheet 62.

Figure 8:
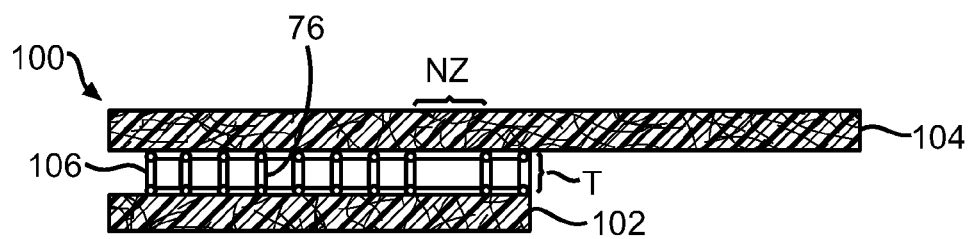
FIG. 8 is a schematic elevational view in cross-section of a third embodiment of a laminated shingle according to the invention.

Referring now to FIG. 8, a cross-sectional elevational view of a third embodiment of a laminated shingle having a structural lattice layer is shown at 100. The laminated shingle 100 includes an underlay sheet 102, an overlay sheet 104, and a structural lattice layer 106. In the embodiment illustrated in FIG. 8, the underlay sheet 102 and the lattice layer 106 are of substantially equal width. The overlay sheet 104 has a width larger than the widths of the underlay sheet 102 and the lattice layer 106. It will be understood that the structural lattice layer 106 may have any desired height or thickness T. A nail zone is defined at NZ and is configured such that a nail will extend through the overlay sheet 104, the lattice layer 106, and the underlay sheet 102.

Figure 9:
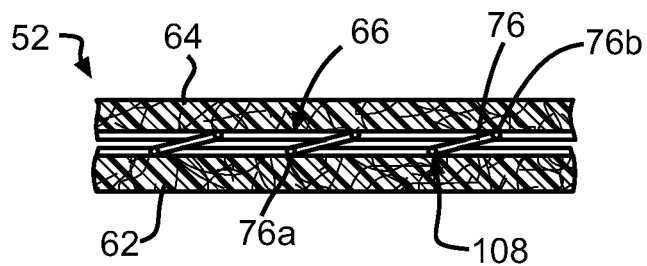
FIG. 9 is a schematic elevational view in cross-section of a portion of the laminated shingle illustrated in FIG. 6, showing the laminated shingle in a substantially flat position.
Figure 10:
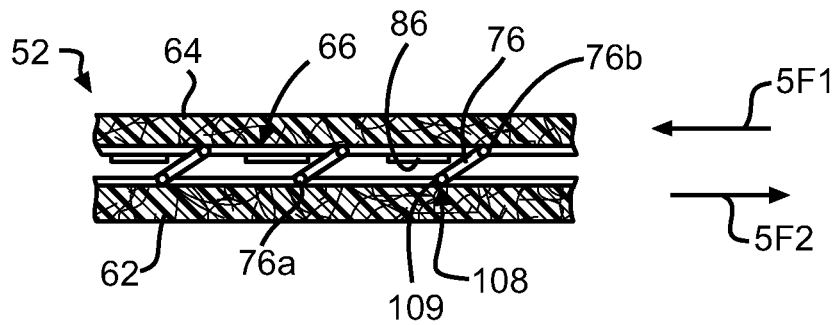
FIG. 10 is a schematic elevational view in cross-section the laminated shingle illustrated in FIG. 9, showing the laminated shingle in a position intermediate the substantially flat position and a fully spaced position.
Figure 11:
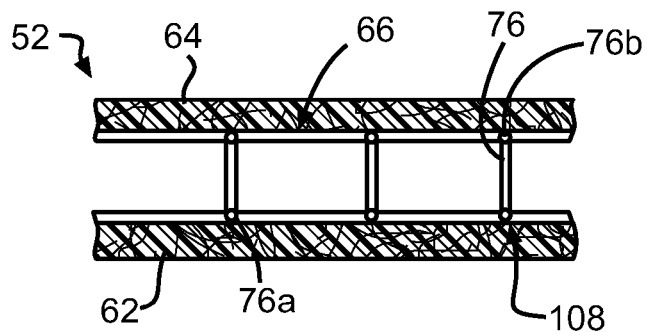
FIG. 11 is a schematic elevational view in cross-section the laminated shingle illustrated in FIGS. 9 and 10 showing the laminated shingle in the fully spaced position.

As best shown in FIGS. 9 through 11, the structural lattice 66 defines a folding member that may be folded or moved between a substantially flat position, as shown in FIG. 9, and a fully open or spaced position, as shown in FIG. 11. The substantially flat position illustrated in FIG. 9 is used for the storage of the laminated shingle 52, so that the laminated shingle 52 does not self-deform due to concentrated stress points, especially when a plurality of the laminated shingle 52 are stacked.

When a thickened laminated shingle 52 is manufactured, such as illustrated in FIG. 1, the structural lattice layer 66 may be configured in the fully spaced position. When the laminated shingles 52 are stacked and packaged for shipment, the structural lattice layer 66 folds upon itself until the structural lattice layer 66 is in the substantially flat position. Alternatively, when a thickened laminated shingle 52 is manufactured, the structural lattice layer 66 may be configured in the substantially flat position.

When it is desired to move the laminated shingle 52 from the substantially flat position to the fully spaced position, a shear force, such as applied by a roofing installer, may be applied to the laminated shingle 52.

As best shown in FIG. 10, the shear force is applied to urge the structural lattice 66 from the substantially flat position to the vertical or fully open position. In the embodiment illustrated in FIG. 10, a shear force may be applied to move the overlay sheet 64 in a first direction SF1 (to the left when viewing FIG. 10) and/or a shear force may be applied to move the underlay sheet 62 in a second direction SF2 opposite the first direction (to the right when viewing FIG. 10). Such a shear force will urge the overlay sheet 64 away from the underlay sheet 62, thereby causing the structural lattice 66 to move to the fully spaced position, as shown in FIG. 11. This transitional movement of the structural lattice 66 from the substantially flat position, through the intermediate position, to the fully open position may occur just prior to field installation of the laminated shingle 52. The fully spaced position, as shown in FIG. 11 is achieved after laminated shingle 52 is field-installed.

The bases 76a of the arches, which extend along the longitudinal members 72, define a living hinge 108. The living hinge 108 allows the structural lattice 66 to easily move between the substantially flat position and the fully spaced position.

As discussed above, the base 70 may be attached to an upper surface of the underlay sheet 62 with adhesive 109. To prevent such adhesive from adhering to the underside of the overlay sheet 64 when the laminated shingle 52 is in the substantially flat position, longitudinally extending strips of release tape 86 may be applied to the underside of the overlay sheet 64 opposite the adhesive 109 of the base 70. An example of a suitable tape is MYLAR® tape. Alternatively, other tapes such as polyester, single sided silicone impregnated webbing, or waxed paper may be used.

Figure 12A:
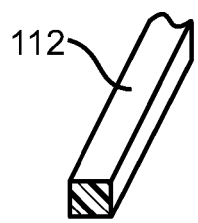
FIG. 12A is an enlarged perspective view in cross-section of a lip member.
Figure 12B:
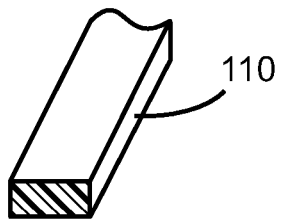
FIG. 12B is an enlarged perspective view in cross-section of a nail spline.
Figure 13:
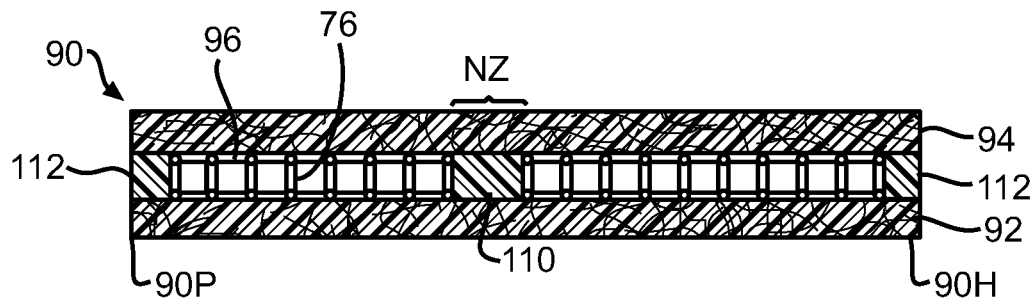
FIG. 13 is a schematic elevational view in cross-section of the laminated shingle illustrated in FIG. 6, showing the lip members and the nail spline installed.

If desired, a nail spline 110 may be inserted between longitudinal rows of arches 76 in the nail zone NZ of the laminated shingle 90, as shown in FIG. 13. The nail spline 110 may be an elongated member having a rectangular cross section, as shown in FIG. 12B. Alternatively, the nail spline 110 may be formed as a tube having a rectangular cross section. The nail spline 110 may be formed of any desired material, such as plastic or wood. The nail spline 110 may be secured between the overlay sheet 94 and the underlay sheet 92 with adhesive or with the nails used during shingle installation. The nail spline 110 may be installed within the laminated shingle 90 at any time prior to securing the laminated shingle 90 to the roof with nails. The illustrated nail spline 110 provides a solid base for the field installation of fasteners such as nails. It will be understood that the nail spline 110 also provides the laminated shingle 90 with improved impact resistance.

Figure 18:
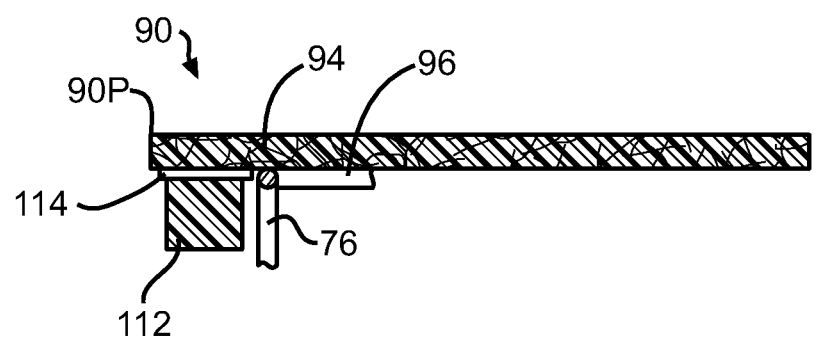
FIG. 18 is an enlarged schematic elevational view in cross-section of a portion of the laminated shingle illustrated in FIG. 13.

Further, it may be desirable to provide additional support at the headlap edge 90H and the prime edge 90P of the laminated shingle 90. Lip members 112 may therefore be inserted between the overlay sheet 94 and the underlay sheet 92 as shown in FIG. 13. The lip member 112 may be an elongated member having a rectangular cross section, as shown in FIG. 12A. Alternatively, the lip member 112 may be formed as a tube having a rectangular cross section. The lip member 112 may be formed of any desired material, such as plastic and modified polymers such as dense foam material. If desired, the lip members 112 may secured between the overlay sheet 94 and the underlay sheet 92 with adhesive 114, as best shown in FIG. 18. The illustrated lip member 112 provides the laminated shingle 90 with improved impact resistance. It will be understood that the lip member 112 at the prime edge 90P of the laminated shingle 90 may additionally provide an aesthetically pleasing edge at the prime edge 90P.

Figure 19:
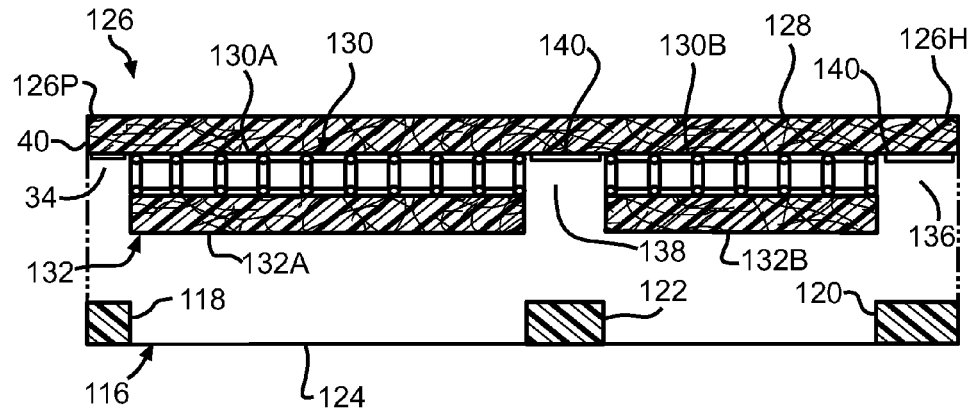
FIG. 19 is an exploded schematic cross-sectional view in elevation of a fourth embodiment of a laminated shingle having a first embodiment of a spline assembly.

Alternatively, the lip members and spline may be configured as a spline assembly, such as illustrated at 116 in FIG. 19. The first embodiment of the spline assembly 116 may include one or more lip members 118 and 120, and/or a nail spline 122 attached to a mesh or net base 124. The spline assembly 116 may be bonded to a fourth embodiment of a laminated shingle 126.

The illustrated laminated shingle 126 includes an overlay sheet 128, a structural lattice layer 130 comprising a first portion 130A and a second portion 130B, and an underlay sheet 132 comprising a first portion 132A and a second portion 132B. A first lip gap 134 is defined at a prime edge 126P of the laminated shingle, and a second lip gap 136 is defined at a headlap edge 126H. A spline gap 138 is formed between the first portions of the structural lattice layer and the underlay sheet 130A and 132A, respectively, and the second portions of the structural lattice layer and the underlay sheet 130B and 132B, respectively, and an underlay sheet 132 comprising a first portion and a second portion.

The lip members 118 and 120, and the nail spline 122 may be bonded to the underside of the overlay sheet 128 with adhesive 140 applied longitudinally to the underside of the overlay sheet 128 within the first lip gap 134, the second lip gap 136, and the spline gap 138. The adhesive 140 may be any desired adhesive, such as modified asphalt adhesive. Additionally, a silicone impregnated tape (not shown) may be applied to the adhesive 140 to prevent the adhesive 140 from activating prior to installation of the laminated shingle 126. The silicone impregnated tape would be removed immediately prior to field installation of the laminated shingle 126.

Figure 20:
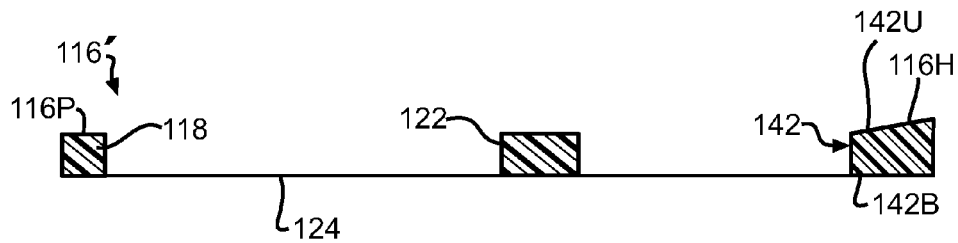
FIG. 20 is a cross-sectional view in elevation of a second embodiment of a spline assembly.

An alternative, second embodiment of the spline assembly is shown generally at 116' in FIG. 20. The spline assembly 116' includes the lip member 118 at the headlap edge 116H of the spline assembly 116', the nail spline 122, and a lip member 142 at the prime edge 116P of the spline assembly 116', attached to a mesh or net base 124. The lip member 142 is configured to be bonded within the second lip gap 136 at the headlap edge 126H of the laminated shingle 126. The lip member 142 is an elongated member having a trapezoidal cross section having a first or base surface 142B and a second or upper surface 142U, as shown in FIG. 20. Alternatively, the lip member 142 may be formed as a tube having a trapezoidal cross section. The lip member 142 may be formed of any desired material, such as plastic. If desired, the lip member 142 may secured to the overlay sheet 128 with adhesive 140, as described above.

In the illustrated embodiment, the lip member 142 is formed such that the distance between the base surface 142B and the underside of the overlay sheet 128 at the headlap edge 126H of the laminated shingle 126S is greater than the distance between the base surface 142B and the underside of the overlay sheet 128 at an inboard side of the lip member 142. When the laminated shingle 126 having the spline assembly 116' and lip member 142 is installed on a roof, the angled and relatively thicker headlap portion defined by the lip member 142 facilitates water drainage on a roof and reduces the occurrence of water intrusion between the headlap portion of one course of shingles and the prime portion of the overlapping adjacent course of shingles.

Figure 16A:
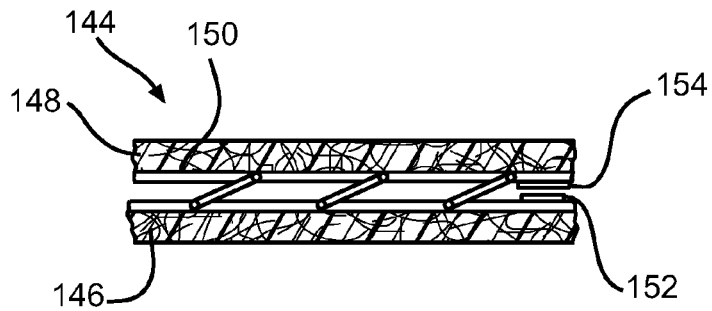
FIG. 16A is a schematic elevational view in cross-section of a fifth embodiment of a laminated shingle, showing the laminated shingle in a position intermediate the substantially flat position and a fully spaced position.
Figure 16B:
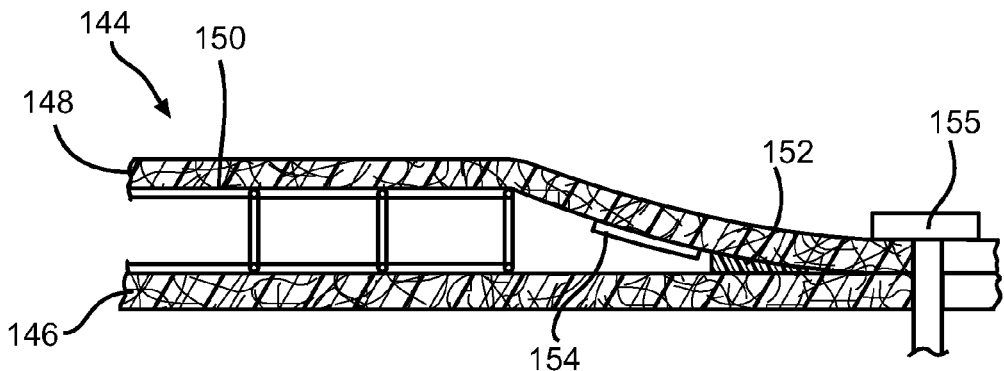
FIG. 16B is a schematic elevational view in cross-section the laminated shingle illustrated in FIG. 16A, showing the laminated shingle in the fully spaced position.

It will be understood that the nail spline 122 is not required in some embodiments of a laminated shingle according to the invention. For example, referring now to FIGS. 16A and 16B, a cross-sectional elevational view of a portion of a fifth embodiment of a laminated shingle having a structural lattice layer is shown at 144. The laminated shingle 144 includes an underlay sheet 146, an overlay sheet 148, and a structural lattice layer 150. In FIG. 16A, the laminated shingle 144 is illustrated in the flat position. In FIG. 16B, the laminated shingle 144 is illustrated in the spaced position.

As shown in FIG. 16B, adhesive 152 may be applied longitudinally to the upper surface of the underlay sheet 146 of the laminated shingle 144 at one or more locations. A strip of release tape 154 may extend longitudinally and may be adhered to the underside of the overlay sheet 148, such that the release tape 154 is opposite the adhesive 152 when the laminated shingle 144 is in the substantially flat position.

When it is desired to move the laminated shingle 144 from the substantially flat position to the fully spaced position, a shear force, such as applied by a roofing installer, may be applied to the laminated shingle 144, separating the adhesive 152 from the overlay sheet 148 or the release tape 154, and urging the structural lattice layer 150 from the substantially flat position to the fully open position. When the laminated shingle 144 is in the fully spaced position, a nail 155 may be driven through the overlay sheet 148 and the underlay sheet 146 as shown in FIG. 16B. After the nail 155 is driven through the overlay sheet 148 and the underlay sheet 146, the adhesive 152 adheres to the underside of the overlay sheet 148. The adhesive 152 may be a self activating adhesive that bonds with the overlay sheet 148, provides a barrier that prevents unwanted water intrusion, prevents blow-off, and provides other benefits.

Figure 17:
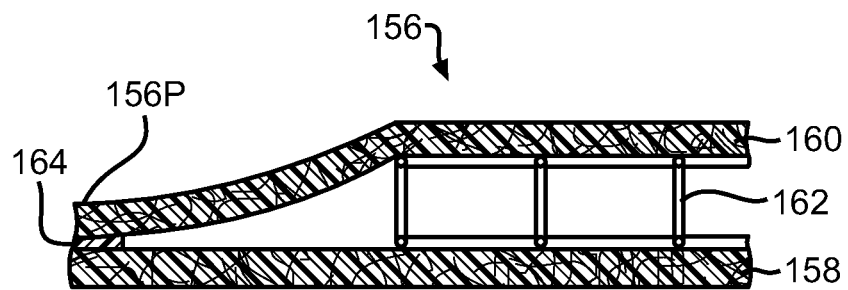
FIG. 17 is a schematic elevational view in cross-section of a sixth embodiment of a laminated shingle, showing the laminated shingle in the fully spaced position.

It will be understood that a lip member at the prime and/or headlap edges of a laminated shingle is not required. For example, referring now to FIG. 17, a cross-sectional elevational view of a portion of a sixth embodiment of a laminated shingle having a structural lattice layer is shown at 156. The laminated shingle 156 includes an underlay sheet 158, an overlay sheet 160, and a structural lattice layer 162. In FIG. 17, the laminated shingle 156 is illustrated in the spaced position. To provide an aesthetically appealing appearance, adhesive 164 may be applied between the underlay sheet 158 and the overlay sheet 160 at the prime edge 156P of the laminated shingle 156. The adhesive 164 may be any desired adhesive, such as modified asphalt adhesive.

Figure 21A:
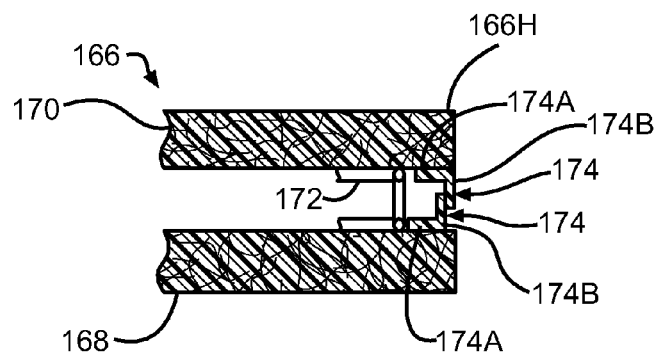
FIG. 21A is an enlarged cross-sectional view in elevation of a portion of a seventh embodiment of a laminated shingle, showing a pair of edge members.

Referring now to FIG. 21A, a portion of a seventh embodiment of a laminated shingle having a structural lattice layer is shown at 166. The laminated shingle 166 includes an underlay sheet 168, an overlay sheet 170, and a structural lattice layer 172.

The laminated shingle 166 includes a pair of edge members 174 that provide additional support at the headlap edge 166H and the prime edge (not shown) of the laminated shingle 166.

The edge members 174 may be inserted between the overlay sheet 170 and the underlay sheet 168 as shown in FIG. 21. It will be understood that the edge members 174 at the prime edge (not shown) of the laminated shingle 166 may additionally provide an aesthetically pleasing edge at the prime edge.

Each edge member 174 may be an elongated member having an L-shaped cross section having a first leg 174A (horizontally oriented when viewing FIG. 21) and a second leg 174B (vertically oriented when viewing FIG. 21). The edge member 174 may be formed of any desired material, such as plastic. One example of a suitable plastic is polyethermide.

The first leg 174A may be adhered to an upper surface of the underlay sheet 168 and an underside of the overlay sheet 170 with adhesive, such as modified asphalt adhesive. As shown in FIG. 21A, the second legs 174B of each of the pair of edge members 174 overlap to provide an aesthetically pleasing appearance.

The pair of edge members 174 may be installed to the laminated shingle 166 after nails are installed on a roof. Alternatively, the pair of edge members 174 may be installed to the laminated shingle 166 at any other desired step of the shingle manufacturing process. For example, if the pair of edge members 174 is installed to the laminated shingle 166 prior to stacking and packing the laminated shingles 166, the pair of edge members 174 facilitate substantially flat stacking and storage of the stacked and/or packaged laminated shingles 166.

Figure 21B:
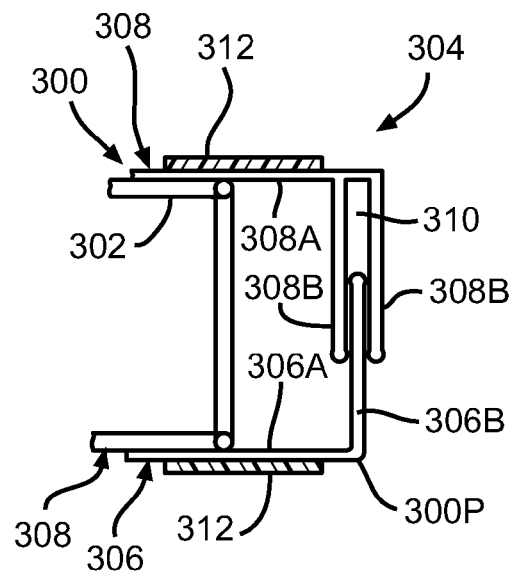
FIG. 21B is an enlarged cross-sectional view in elevation of a portion of an eighth embodiment of a laminated shingle, showing an edge assembly.

Referring now to FIG. 21B, a portion of an eighth embodiment of a laminated shingle having a structural lattice layer is shown at 300. The laminated shingle 300 includes an underlay sheet and an overlay sheet, neither of which are illustrated for purposes of clarity, and a structural lattice layer 302. The laminated shingle 300 includes an edge assembly 304 that provides additional support at the prime edge 300P and the headlap edge (not shown) of the laminated shingle 300. The illustrated edge assembly includes first and second interlocking members 306 and 308, respectively, inserted between the overlay sheet and the underlay sheet as shown in FIG. 21B. It will be understood that the edge assembly 304 at the prime edge 300P of the laminated shingle 300 may additionally provide an aesthetically pleasing edge at the prime edge 300P.

The second interlocking member 308 is an elongated member having a first leg 308A (horizontally oriented when viewing FIG. 21B) and two substantially parallel second legs 308B (vertically oriented when viewing FIG. 21B), defining a groove 310. The first interlocking member 306 is an elongated member having a substantially L-shaped cross section. The first interlocking member 306 has a first leg 306A (horizontally oriented when viewing FIG. 21B) and a second leg 306B (vertically oriented when viewing FIG. 21B). The second leg 306B is inserted into the groove 310 to interlock the first and second interlocking members 306 and 308, and to provide an aesthetically pleasing appearance. The edge assembly 304 may be formed of any desired material, such as plastic. One example of a suitable plastic is polyethermide.

The first leg 308A may be adhered to an upper surface of the underlay sheet with adhesive 312, such as modified asphalt adhesive. Similarly, the first leg 306A may be adhered to an underside of the overlay sheet with adhesive 312, such as modified asphalt adhesive.

The edge assembly 304 may be installed to the laminated shingle 300 after nails are installed on a roof. Alternatively, the edge assembly 304 may be installed to the laminated shingle 300 at any other desired step of the shingle manufacturing process. For example, if the edge assembly 304 is installed to the laminated shingle 300 prior to stacking and packing the laminated shingles 300, the edge assembly 304 facilitates substantially flat stacking and storage of the stacked and/or packaged laminated shingles 300.

Figure 21C:
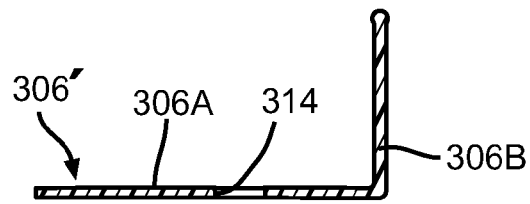
FIG. 21C is an enlarged cross-sectional view in elevation of the second embodiment of the first interlocking member illustrated in FIG. 21B.
Figure 21D:
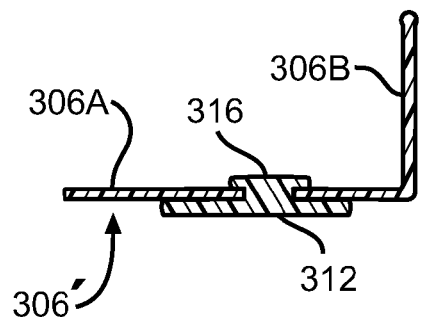
FIG. 21D is an enlarged cross-sectional view in elevation of the second embodiment of the first interlocking member illustrated in FIGS. 21B and 21C, showing the adhesive rivet.

Referring now to FIGS. 21C and 21D, a second embodiment of the first interlocking member is shown at 306'. A plurality of apertures 314 are formed through the first leg 306A'. When a layer of adhesive 312 is applied to the first leg 306A', a portion of the adhesive 312 extends through the aperture 314 to define an adhesive rivet 316. The adhesive rivet 316 additionally mechanically fastens the adhesive 312 against the first leg 306A' and improves bonding between the first leg 306A' and the upper surface of the underlay sheet. It will be understood that in lieu of the aperture 314, the first leg 306A' may be formed with a plurality of cavities or depressions, within which the adhesive 312 may flow to mechanically fasten the adhesive 312 against the first leg 306A'.

The present invention should not be considered limited to the specific examples described herein, but rather should be understood to cover all aspects of the invention. Various modifications, equivalent processes, as well as numerous structures and devices to which the present invention may be applicable will be readily apparent to those of skill in the art. Those skilled in the art will understand that various changes may be made without departing from the scope of the invention, which is not to be considered limited to what is described in the specification.

What is claimed is:

1. A laminated roofing shingle comprising:
an underlay sheet including an asphalt coated fiberglass mat;
an overlay sheet separate from the underlay sheet and including an asphalt coated fiberglass mat and granules on an upper surface of the asphalt coated fiberglass mat; and
a structural lattice layer bonded between the underlay sheet and the overlay sheet by a modified asphalt adhesive, the structural lattice layer defined a space between the underlay sheet and the overlay sheet.

2. The laminated roofing shingle according to claim 1, wherein the structural lattice layer defines an impact resistant layer.

3. The laminated roofing shingle according to claim 2, wherein the structural lattice layer defines a folding member, and wherein the folding member folds between a substantially flat position and a fully spaced position.

4. The laminated roofing shingle according to claim 3, wherein the folding member includes a living hinge.

5. The laminated roofing shingle according to claim 4, wherein the living hinge is movable such that the underlay sheet and the overlay sheet are movable relative to one another upon application of a shear force.

6. The laminated roofing shingle according to claim 1, wherein the structural lattice layer comprises a base and a plurality of support members extending outward of the base.

7. The laminated roofing shingle according to claim 6, wherein the base is attached to the underlay sheet.

8. The laminated roofing shingle according to claim 7, wherein the support members include a first end at the base, and a second end opposite the first end, the second end attached to an underside of the overlay sheet.

9. The laminated roofing shingle according to claim 8, wherein the base and the first end of the support members define a living hinge.

* * * * *